Patented Jan. 8, 1946

2,392,639

UNITED STATES PATENT OFFICE 2,392,639

PRESSURE-SENSITIVE ADHESIVE AND ADHESIVE TAPE

Howard C. Brinker, St. Paul, and Gilbert B. Gehrenbeck, Bald Eagle Lake, Minn., assignors to Minnesota Mining & Manufacturing Company, St. Paul, Minn., a corporation of Delaware No Drawing. Application April 16, 1943, Serial No. 483,354

18 Claims. (Cl. 106—171)

This invention relates to pressure-sensitive adhesives and adhesive tapes; a pressure-sensitive adhesive being one that is normally and stably tacky and sticks without need of activation by water, solvents or heat. Such adhesives have, in the past, been most commonly compounded of rubber, resinous tack-producing material (tackifier) such as rosin or ester gum, and a reinforcing pigment such as zinc oxide. The latter is omitted in transparent adhesives, such as those employed in making transparent adhesive tapes for mending records and sealing packages. A disadvantage of transparent adhesives made of natural rubber, employed in transparent adhesive tapes, is that they gradually darken and soften due to the effects of air (oxygen) and sunlight. Furthermore such adhesives, whether or not of the transparent type, lack resistance to mineral oils, which is disadvantageous as regards certain types of adhesive tape.

Objects of the present invention include the making of a pressure-sensitive adhesive which is free from these disadvantages, but which at the same time has a good tack and a high cohesiveness and other qualities which are needed in making high quality adhesive tapes. An incidental advantage of this invention is that it does not depend upon the use of natural rubber. An adhesive is provided which is well suited to use in making transparent adhesive tapes.

The pressure-sensitive adhesive of the present invention utilizes, in combination with a compatible tackifier, a rubbery base constituted of a toluol-soluble alkyd resin elastomer formed by the reaction of a polyhydric oil (such as castor oil) and polybasic acid (such as citric acid). The tackifier may, for example, be rosin or ester gum. Firming agents may be used to increase the cohesiveness of the adhesive; as the adhesive should be "eucohesive," by which it is meant that it is more cohesive than adhesive in order that adhesive tape can be unwound from rolls, and stripped from surfaces to which temporarily applied, without offsetting of adhesive. An example of a firming agent useful in making transparent eucohesive adhesives, is ethyl cellulose, a film-forming eupolymer which is fully compatible with the combination of alkyd resin elastomer and resin components such as rosin or ester gum.

This alkyd resin elastomer is to be distinguished from the viscid plasticizers which have been made by reacting castor oil and a polybasic acid (such as citric acid). In the present case, the reaction is advanced to produce a firm, tough, rubbery mass, which is a much higher polymer than the intermediate viscid oil which has been proposed as a plasticizer to be used in place of castor oil. The elastomer has a solid gel structure, and the transition from a viscid oil to the gel is quite abrupt.

The adhesive can be dissolved or dispersed in a volatile liquid vehicle, such as toluol, and can be conveniently coated in this form, the vehicle subsequently evaporating away to leave a stably tacky adhesive coating which is resistant to mineral oils. Thus it can be easily coated upon any desired backing in the making of adhesive tapes (such as on backings of cloth, unified paper, non-fibrous films, etc.).

The nature of the adhesive will be further brought out in connection with the following illustrative examples, in which all parts are by weight:

EXAMPLE 1

A

| | Pounds |
|---|---|
| Castor oil (No. 3 grade) | 600 |
| Citric acid (monohydrate, crystals) | 120 |

B

| | |
|---|---|
| Ester gum (acid Number 2–10) | 340 |
| Alkyd resin produced under "A" | 680 |
| "Amsco-Solv A" solvent (240 gals.) | 1,590 |

C

| | |
|---|---|
| Ethyl cellulose | 15 |
| (Hercules "N" type, 46.8–48.5% ethoxy, 35,000–40,000 cps. viscosity) | |
| Tertiary butyl alcohol | 35 |
| "Amsco-Solv A" | 250 |

D (product)

| | |
|---|---|
| Solution "B" | 1,500 |
| Solution "C" | 507 |
| Ester gum | 58 |
| "Amsco-Solv A" | 900 |

"Amsco-Solv A" is a hydrocarbon solvent containing sufficient aromatics to give an approximate aromatic blending value of 50%, and is sold by the American Mineral Spirits Company of Chicago, Illinois.

To prepare part "A" of the above formula: Heat the castor oil in a stainless steel kettle or its equivalent to about 350° F., a temperature approximately that of the melting point of citric acid. This serves to drive off any water that may be present in the oil, and also the water liberated on addition of the citric acid.

With constant, and preferably mechanical, stirring of the reaction mass, slowly add the citric acid, meanwhile maintaining the temperature at about 350° F. Water is liberated both by the dehydration of the crystalline monohydrated acid and by the esterification of the oil by the acid. This water tends to cause foaming, which might become violent were the entire amount of acid to be added at one time. On the other hand, unduly prolonged heating before all acid has been added might result in non-uniform esterification and would be uneconomical. The acid is therefore added as rapidly as possible consistent with the foaming. The acid and water cause corrosion of ordinary iron equipment, resulting in dark colored and lumpy adhesive; hence stainless or corrosion-resistant equipment should be used at this stage.

After all the acid has been added and the foam has subsided, increase the temperature to 385° F. and hold until the desired viscosity has been obtained. A lower temperature might be used, with a corresponding increase in the time required to reach the end point. On the other hand, the temperature might be increased well beyond 385°, but the polymerization reaction then proceeds so rapidly at the end point that the mass sometimes reaches the gel stage before it can be removed from the kettle.

Heating (and stirring) in the kettle is continued until a viscid liquid is produced, at which point the partially reacted alkyd is transferred to a heavy duty internal mixer (such as a Baker Perkins "Mogul mixer") which has previously been heated and charged with the proper weight of ester gum, for preparation of the part "B" composition in the above formula. The viscosity of the alkyd at this point (prior to transfer) is preferably within the range of 800–900 centipoise measured at 302° F., which may be measured with a "Synchro-Lectric" viscosimeter made by the Brookfield Engineering Laboratories of Sharon, Mass. Other viscosities may be used, but lower values result in prolonged reaction time in the internal mixer which is at a lower temperature than that employed in the kettle, while higher values are dangerously close to gel formation at which point transfer of resin to mixer, and mixing of resin and ester gum, is not readily accomplished.

With sufficient steam pressure in the jacket of the internal mixer to produce a batch temperature of 285–300° F., the reaction is allowed to proceed with the mixer open and with continuous working, until the resin has reacted to a tough rubbery gel. The toughness of this gel may be estimated by its appearance under the mixing action of the internal mixer, but preferably is measured on a "Plastograph" recording plasticity measuring device. The "Plastograph" is manufactured by the Brabender Corporation, Rochelle Park, N. J., and as used for this test consists of their small sized mixer with S-shaped blades, operated at 60 R. P. M. with the connection between upper and lower lever arms being so placed that the scale reading in units is three times the actual power input value measured in metergrams. At a value of 650 units on this machine, measured at 212° F., the steam is shut off and cold water turned on in the jacket of the mixer. This placticity value determines the final formula of the adhesive, and to a considerable extent its adhesion value, aging life, and other properties. It may be varied in either direction to a considerable extent depending on the properties desired in the adhesive, but we have found the value 620–680 to be most desirable.

After the resinous gel mass has been sufficiently cooled, with continued mixing, as to a temperature not much greater than the boiling point of the solvent, which ordinarily will require three hours for a batch of the given size, the solvent is added slowly to form a smooth gelatinous solution or dispersion which may be dumped from the heavy duty internal mixer and placed in a simple churn type mixer for further compounding. This completes part "B." The foregoing procedure avoids the formation of lumps or seeds of alkyd resin and produces a smooth, homogeneous composition.

Separately, the part "C" solution of high viscosity ethyl cellulose in "Amsco-Solv A" and the alcohol is prepared. Ethyl cellulose is not completely soluble in "Amsco-Solv A," and the mixture is of extremely high viscosity; alcohol, such as tertiary butyl alcohol, is added to provide a clear solution of reduced viscosity. High viscosity ethyl cellulose is preferred since it provides a more firm adhesive and is required in a lesser amount than low-viscosity grades; however, the viscosity range is not critical provided proper allowance is made in determining the amount to be used.

The proper amount of ethyl cellulose solution is then added to the solution of alkyd resin and ester gum in the churn; more solvent, and in some cases additional ester gum, is added if desired, as shown in the formula of the example; and the mass is mixed until uniform, completing the formulation of the product of the example.

This adhesive solution or dispersion may be coated or spread on any desired base or backing, and the solvent removed by evaporation, to provide an adhesive sheet or tape having a eucohesive pressure-sensitive adhesive surface coating which is clear and transparent, light in color, stably tacky, and which leaves no deposit on surfaces from which the adhesive sheet or tape is stripped.

Examples of non-fibrous film backings which may be employed in making adhesive sheets or tapes are films of regenerated cellulose (Cellophane), cellulose esters (such as cellulose acetate, cellulose butyrate and cellulose aceto-butyrate), cellulose ethers (such as methyl cellulose, ethyl cellulose and butyl cellulose, polyvinyl resin films (such as those made of the copolymers of vinyl chloride and vinyl acetate, elasticized polyvinyl butyral, and polyvinyl alcohol), and rubber hydrochloride (Pliofilm). Composite films can be used, such as a film of cellulose acetate laminated to a film of Cellophane, the adhesive preferably being applied to the Cellophane side. Such films in transparent form may be used in making transparent pressure-sensitive adhesive tape which is highly desirable in that the transparent adhesive does not darken or soften when subjected to extensive exposure to light.

Fibrous backing can be used, such as parchmentized paper, paper unified by impregnation or coating, felted or woven cloth, etc. Felted or woven fabrics of synthetic fibers can be used, such as those made of fibers of cellulose-derivatives (for example, cellulose acetate), vinyl resins, nylon, glass, etc. Such backings may have a back sizing to improve unwinding properties of adhesive tape wound in a roll and to provide an attractive glossy back surface, as for example, a back sizing coating of cellulose acetate.

A sheet material may be coated on both sides with adhesive to provide a tape which is tacky on both sides. For example, a hemp fiber tissue paper may be impregnated and coated on both sides with the adhesive, as described in Kellgren Patent No. 2,206,899, and this may be attached to a temporary liner to facilitate use. Or the impregnated and double-coated tissue paper may be laminated to a non-fibrous film to form an integral pressure-sensitive tape having a non-fibrous film backing, the interposed layer of adhesive uniting the tissue to the film and the tissue reinforcing the adhesive and the tape. The adhesive will transparentize the tissue to result in transparent tape when a transparent backing is used. Similarly a cloth, such as a thin woven cellulose acetate cloth, may be double coated with the adhesive and laminated to a non-fibrous film backing, such as to a film of cellulose acetate, to provide a very strong pressure-sensitive tape having a smooth non-fibrous back surface. Many other types of pressure-sensitive adhesive tape can be made.

The amount of acid used may vary to a considerable extent. While 20 parts by weight of citric acid per 100 parts castor oil represents approximately stoichiometrical proportions and is generally preferred, we have been able to produce satisfactory resins using as low as 12 and as high as 30 parts of this acid. Reaction time, and to some extent properties such as solubility, water resistance, color, etc., will be somewhat dependent on such changes in proportions. Specific adhesion to various surfaces may also be changed by major changes in acid content.

No. 1 castor oil may be substituted for the crude No. 3 grade but at considerably increased cost. While castor oil is specifically mentioned, other non-drying fatty oils containing a plurality of hydroxyl groups may also be used. Unsaturated polyhydroxylated oils classifiable as semi-drying or drying oils might also be employed, but are less desirable due to the tendency of the resins to dry or harden on exposure to air and sunlight, and also to the generally inferior transparency and color of such products. An example of such an oil is a partially hydroxylated linseed oil (illustrated by "Solinox" sold by Spencer Kellogg & Sons Inc., of Buffalo, New York, and which has an acetyl value of about 95).

Other tricarboxylic acids may be used in place of, or in conjunction with, the citric acid; examples are tricarballylic or aconitic acid, or the acid formed by the reaction of maleic anhydride with abietic acid.

Dibasic acids may also be used. The adhesives produced by the use of dibasic acids alone are sometimes softer than those in which at least part of the acid is tribasic; this may in some cases produce a desirably improved adhesion, although usually at the expense of some internal strength. Maleic anhydride, phthalic anhydride, succinic acid, sebasic acid, and the adducts formed by reaction of maleic anhydride with various terpenes (such as pine oil), are examples of various dibasic acids which, particularly in conjunction with tribasic acid such as citric, produce satisfactory alkyds for adhesive compositions.

EXAMPLE 2

A

| | Parts |
|---|---|
| Castor oil | 100 |
| Citric acid | 10 |
| Maleic anhydride | 8 |

The citric acid and maleic anhydride may be added together, or they may be added separately and in any order. However, if the maleic anhydride be added first, care must be taken to add the citric acid before any appreciable thickening of the mass has taken place, since such thickening increases the amount and toughness of the foam produced. The alkyd resin of this example may be further processed as under "B," "C" and "D" of Example 1.

Another possibility in making an alkyd of more than one acid is to cook each one separately, in the correct aliquot of oil, to a point at which the acid has all been taken up by the oil but before any significant increase in viscosity has been attained. The two semi-processed alkyds are then mixed, and the reaction continued to the proper viscosity as described in connection with Example 1. The following illustrates proportions:

EXAMPLE 3

A—1

| | Parts |
|---|---|
| Castor oil | 100 |
| Citric acid | 20 |

Heat oil to 350° F.
Add acid as rapidly as possible consistent with foaming.
Raise temp. to 385° F., hold 15 min.

A—2

| | |
|---|---|
| Castor oil | 100 |
| Maleic anhydride | 16 |

Add anhydride to oil, heat directly to 385° F., hold 15 min.

A—3

Combine "A—1" and "A—2", continue heating to proper viscosity, and use in place of resin "A" of Example 1.

The following example illustrates the use of a dibasic acid alone, with a combination of tackifiers, and with an ethyl cellulose of lower viscosity.

EXAMPLE 4

A

| | Parts |
|---|---|
| Castor oil | 536 |
| Maleic anhydride | 84.8 |

B

| | |
|---|---|
| Pentalyn A | 275 |
| (Commercial pentaerythritol abietate) | |
| Alkyd resin produced under "A" | 1,100 |
| "Amsco-Solv A" | 1,245 |

C

| | |
|---|---|
| Ethyl cellulose | 15 |
| (Hercules "N" type, 46.8–48.5% ethoxy, 12,000 cps. viscosity) | |
| Tertiary butyl alcohol | 35 |
| "Amsco-Solv A" | 250 |

D

| | |
|---|---|
| Ester gum (acid Number 2–10) | 80 |
| "Amsco-Solv A" | 80 |

E (product)

| | |
|---|---|
| Solution "B" | 757 |
| Solution "C" | 576 |
| Solution "D" | 160 |
| "Amsco-Solv A" | 800 |

To prepare part "A" of the above formula, the oil and anhydride are heated together to 400° F. and maintained at that temperature for approximately three and a half hours; the temperature is then allowed to drop to about 385° F., and the resin is transferred to the Mogul mixer as soon as it reaches a viscosity of approximately 1000 cps. measured as before.

One-half of the total tackifier is added in the Mogul mixer under part "B"; the balance is dissolved in a portion of the solvent and is added during the final mixing under part "E."

Referring again to the general procedure, it is possible to obtain an adhesive which is satisfactory for some uses by reacting the alkyd resin alone in the internal mixer, in which case the ester gum and ethyl cellulose may both be added in solution in the churn. This is desirable where certain other resinous tackifiers, notably rosin, are used in place of the ester gum, since heating of these materials in the internal mixer generally causes considerable darkening. However, it is preferred to pre-melt the ester gum in the mixer and to react the alkyd in admixture with the ester gum. Such procedure slows down and permits better control of the reaction, prevents or diminishes local overheating, and yields a much smoother product, as well as improving the rate of dispersion of the finished mass in the solvent. Rosin or its derivatives containing the abietate radical, such as ester gum, hydrogenated ester gum, rosin ester of pentaerythritol, hydrogenated rosin, polymerized rosin, etc. may be used. The ester gum may be of the low acid number type (acid Number 2–10) or may be of a partially esterified type having a high acid number. Other resins which are compatible with the alkyd and produce the desired tackiness without undue softness may also be used. For example, No. 254 Bakelite resin has been used as tackifier.

An alternate method of reacting the alkyd resin to controllable high plasticity, and one which is particularly useful where it is desirable to use heat-sensitive tackifiers, is to react in the presence of a high-boiling solvent. For example, the resinous oil as produced under "A" of Example 1 may be dissolved in a solvent such as xylol, or "Amsco-Solv B," which is a higher-boiling material otherwise similar to "Amsco-Solv A," and the solution heated further at or near the initial boiling point of the solvent. During such heating a small amount of water is evolved, and the viscosity of the mixture increases. The progress of the reaction may be controlled by reference to viscosity and solids content; a favorable viscosity is 30–40 at 240° F., using the "Mac Michael" viscosimeter with No. 30 wire, operated at 20 R. P. M. and using 1 cm. diameter spindle immersed for a depth of 4 cms. This value is for a solution which has been diluted to approximately 25% solids.

Another method of producing the resin in a solvent and more particularly in a lower-boiling solvent, is by carrying out the reaction in a pressure vessel. When employing such means, it is necessary to reflux an appreciable amount of the solvent in order to remove the water evolved during the reaction. We have found that this high reflux ratio has a further advantage in that it displaces the thermal equilibrium of the system and permits the use of relatively low pressures with what would otherwise be excessively high temperatures of the reactants. This latter advantage is of course not confined exclusively to systems including alkyd type resins.

Although adhesives having essentially equivalent properties may be made from resinous solutions made by the two methods outlined, e. g. reaction with ester gum and reaction in volatile solvent, and although viscosity measurements, or, what would seem to be equivalent, plasticity measurements, are relied on for control of reaction in both methods, yet it does not necessarily follow that the two solutions made to exactly the same formula, as by addition of ester gum to the second and high-boiling solvent to the first, need have the same viscosities. This may be due to a reaction between the alkyd and ester gum in the first method, or to a different degree of solvation, or to a tendency of one or the other of the solutions to thicken or gel on standing, or to other reasons. It is therefore necessary to determine an end point for each combination of raw materials and method of reaction; once determined, such end point may be readily applied for the control of further batches made in the same way. Determination of such end point is best accomplished by reference to the properties of the finished adhesive. Softer alkyds increase the adhesion or tackiness, but reduce the cohesive strength; this requires additional firming agent, which again reduces the adhesion; but addition of further tackifier then yields a resinous, brittle type of adhesion. On the other hand, too firm an alkyd will be difficult to put or keep in coatable solution. The most desirable type will be found between these extremes.

Both the adhesive and the cohesive strength of the adhesive mass are dependent, as indicated above, on the ingredients of the alkyd and the extent to which they are reacted and subsequently worked cold in the mixer; on the ethoxy value and viscosity of the ethyl cellulose; on the melting point of the tackifier; and on other factors. A balance must therefore be obtained among the various ingredients in order to achieve the desired values. Tests of adhesion value and splitting tendency are valuable in determining the correct proportions to be used. Adhesion may be measured by pressing a strip of tape of prescribed dimensions to the surface of a steel or glass plate under controlled conditions, and noting the removal effort when the tape is peeled from the plate. Splitting tendency may be determined by pressing a strip of tape firmly to a piece of Cellophane (or cellulose acetate or other surface depending on the type of tape and the use to which it is to be put) heating the combination, as for 5 minutes at 160° F., cooling to room temperature, and slowly removing the tape from the Cellophane; a satisfactory tape will leave no deposit nor stain on the Cellophane.

A certain percentage of aromatic hydrocarbon, or other active solvent, is necessary in the solvent mixture in order to dissolve the alkyd. While toluol or the like may be used as such, it is more economical to use solvents such as "Amsco-Solv A" which contain a proportion of aliphatic hydrocarbons. Various alcohols (such as tertiary butyl alcohol), esters (such as amyl acetate), and ketones (such as methyl ethyl ketone), may also be used either alone or with hydrocarbon solvents or diluents (such as toluol and heptane), although the aging characteristics of the resin solutions thus produced are in some cases less desirable than where use is made of an aromatic type hydrocarbon solvent only.

Instead of using ethyl cellulose as the firming agent, use can be made of other film-forming eupolymers which are fully compatible with the alkyd resin elastomer and tackifier. For example, cellulose nitrate can be employed, provided use is made of a suitable solvent such as "Cellosolve" (ethylene glycol monoethyl ether), in place of the tertiary butyl alcohol and "Amsco- Solv A" of part C of Example 1. Polyvinyl butyral may also be used as a firming agent for the resinous coating as shown in the following example:

EXAMPLE 5

A

Same as "A" in Example 1.

Parts

B

Alkyd resin "A"_____ 1,000
React in internal mixer to stage at which resin starts to crumble. Cool, and dissolve in "Amsco-Solv A" sufficient to give workable viscosity.

C

Polyvinyl butyral ("Butvar")_____ 100
Tertiary butyl alcohol_____ 900

D

Alkyd resin from Sol'n. "B," dry basis_____ 100
Polyvinyl butyral from Sol'n. "C," dry basis_ 15
Ester gum _____ 20
"Amsco-Solv A" and tertiary butyl aclohol as present in solutions "B" and "C," and further amounts as required for coatable viscosity.

This adhesive solution may be coated, for example, on cellulose acetate cloth or film to produce a pressure-sensitive tape. The use of this adhesive on a straight Cellophane backing is not desirable, since its adhesion to the Cellophane is so great in comparison to its cohesive strength that unwinding of the tape from the finished roll frequently causes splitting of the adhesive layer. However, the adhesive may be used on cellulose acetate backings, or for example on a laminated backing consisting of regenerated cellulose film laminated to a back film or coating of cellulose acetate, or on suitably treated paper, such as paper covered on the back with cellulose acetate, without such splitting taking place on unwinding of the roll.

A supplementary method of obtaining increased firmness in the alkyd adhesive is the reaction of boric acid, borax, or alkyl borates with the alkyd either before, during or after its application to the backing. For example, a dilute solution of boric acid in alcohol may be applied to Cellophane and the solvent removed by evaporation. Adhesive as prepared in Example 1 above, or preferably with somewhat less ester gum and softer alkyd, is coated over the prepared surface and dried. The boric acid reacts with the alkyd or at least in some way affects the alkyd adhesive mixture so that the final surface is much firmer, although slightly less tacky than when the adhesive is applied directly to untreated Cellophane. The amount of such firming action is directly related to the amount of boric acid used. The reaction with boric acid takes place readily without heating, although with borax heating is desirable to speed up the reaction. Or, small amounts of amyl borate may be dissolved in "Amsco-Solv A" and mixed with the adhesive to give somewhat the same effect, although this method has the disadvantage of increasing the viscosity of the solution before coating.

To achieve a satisfactory viscosity of the adhesive for coating, while still incorporating a borate in the solution, which method of course has the advantage of not requiring an additional controlled coating operation on the backing, a method such as the following may be employed:

To the gelatinous suspension in aromatic solvent of an alkyd resin, reacted either in the dry state or in solution as hereinbefore described, is added a saturated solution of boric acid in ethyl alcohol, and the mixture is allowed to stand at normal or preferably at somewhat elevated temperatures. After a proper time interval, which depends for any given mixture on the temperature employed, the originally firm and tough gel is found to have been converted to a smooth watery liquid. Ethyl cellulose solution, or preferably in this case dry ethyl cellulose, is then added, together with ester gum or other tackifier, as needed; and the solution mixed until smooth and homogeneous before coating.

Still a fourth method consists in adding the boric acid or borax to a water-dispersed priming coat which is first applied to the Cellophane. This primer may advantageously consist of a well-reacted alkyd resin of the same composition as that of part "B" of Example 1 before addition of solvent, to which is added a dispersing agent such as a rosin soap, a protective colloid and hydrophilic adhesive such as casein, water to produce a dispersion, and the solution of borax. Such a primer when pre-coated on Cellophane will provide improved anchorage to the Cellophane by virture of the adhesive power of the casein, will provide a firm bond between the alkyd resin of the primer and the adhesive, and will also act as a carrier for the borax which is thus enabled to react with the adhesive after its application to the backing.

The water dispersed composition of the preceding paragraph containing borax, may in some cases be used as an adhesive as well as a primer. Coated on a porous or absorbent backing, the casein apparently moves toward the backing while the alkyd migrates outwardly, drying down to an adhesive film which is well anchored to the backing, and still has satisfactory tackiness and firmness. It is not necessary to use a porous or absorbent backing.

Certain pigments may be added to any of the described adhesive compositions for purposes of extending, opacifying, or coloring, or otherwise modifying their properties, if care be taken to avoid excessive amounts of materials such as zinc oxide or calcium hydroxide which show a tendency to react with the alkyd resin due to its acidic nature. Such modifying agents may be added as pastes or powders to the finished adhesive and ground in by means of a paint mill. The pigment may be dispersed, especially in the case of adhesives characterized by Example 5, in the firming agent, as for example by hot milling on a rubber mill prior to solution of the Butvar in alcohol. Or the pigment may be added directly to the alkyd resin of Example 5, or to the alkyd resin-ester gum mixture of Example 1, just prior to or during the cooling period in the internal mixer and before the addition of solvent. An example of a pigment suitable for such addition is titanium dioxide, which in the case of Example 1 may be used in the proportion of 25 to 75 pounds, although not limited thereto.

The adhesives of this invention, and particularly the transparent adhesives when coated on a transparent or translucent backing, have specific advantages over previously known, and especially rubber base, adhesives when used under exposure to sunlight. Tapes used for mending torn papers and for supporting posters, for example, are often exposed to sunlight as well as to air. Under these conditions, natural rubber adhesives pass through a soft stage, permitting slipping of the tape and penetration, oozing or flowing of the adhesive, and at the same time the adhesive becomes darker in color. Our adhesives, on the other hand, not only do not soften nor discolor under the influence of air and sunlight, but actually tend to firm up and bleach out when so exposed, and may be referred to as "solar hardening."

Having described various illustrative embodiments of our invention, but without intent to be limited thereto, what we claim is as follows:

1. A tacky pressure-sensitive eucohesive adhesive comprising a rubbery base, essentially constituted of a toluol-solvent alkyd resin elastomer reaction product of a polyhydric oil and polybasic acid; combined with a tackifier resin containing the abietate radical.

2. A coatable adhesive solution comprised of the adhesive of claim 1 dispersed in a volatile vehicle.

3. A tacky pressure-sensitive eucohesive adhesive comprising a rubbery base, essentially constituted of a toluol-soluble alkyd resin elastomer reaction product of a polyhydric oil and polybasic acid, at least part of which is citric acid; combined with a tackifier resin containing the abietate radical.

4. A tacky pressure-sensitive eucohesive adhesive comprising a rubbery base, essentially constituted of a toluol soluble alkyd resin elastomer reaction product of castor oil and polybasic acid, at least part of the acid being tribasic, combined with a tackifier resin containing the abietate radical.

5. A tacky pressure-sensitive eucohesive adhesive comprising a rubbery base, essentially constituted of a toluol-soluble alkyd resin elastomer reaction product of castor oil and citric acid; combined with a tackifier resin containing the abietate radical.

6. A coatable adhesive solution comprised of the adhesive of claim 5 dispersed in a volatile hydrocarbon vehicle.

7. A tacky pressure-sensitive eucohesive adhesive comprising a rubbery base, essentially constituted of a toluol-soluble alkyd resin elastomer reaction product of castor oil and polybasic acid, combined with a tackifier resin containing the abietate radical, and a mutually compatible film-forming eupolymer firming agent.

8. A tacky pressure-sensitive eucohesive adhesive comprising a toluol-soluble alkyd resin elastomer reaction product of castor oil and citric acid, combined with a tackifier resin containing the abietate radical, and a compatible cellulose-derivative firming agent of the class consisting of ethyl cellulose and cellulose nitrate.

9. A tacky pressure-sensitive eucohesive adhesive comprising a toluol-soluble alkyd resin elastomer reaction product of 100 parts castor oil and 12–30 parts citric acid, combined with a lesser proportion of ester gum tackifier and a still lesser proportion of ethyl cellulose firming agent, said adhesive forming clear transparent coatings which do not darken nor soften when exposed to sunlight and being adapted to use in transparent pressure-sensitive adhesive tape.

10. A coatable adhesive solution comprised of the adhesive of claim 9 dispersed in a volatile aromatic hydrocarbon vehicle containing a minor proportion of an alcohol viscosity reducer.

11. Pressure-sensitive adhesive tape characterized by having a coating of the adhesive specified in claim 1.

12. Pressure-sensitive adhesive tape characterized by having a coating of the adhesive specified in claim 4.

13. Pressure-sensitive adhesive tape characterized by having a coating of the adhesive specified in claim 7.

14. A transparent adhesive tape having a transparent film backing coated with the pressure-sensitive adhesive specified in claim 8.

15. A transparent adhesive tape having a transparent film backing coated with the pressure-sensitive adhesive specified in claim 9.

16. The method of making the adhesive of claim 1 which comprises heating together the polyhydric oil and polybasic acid in proportions and for a time sufficient to form a toluol-soluble elastomeric gel while mixing together so as to secure a smooth product free from lumps or seeds and incorporating the tackifier at any suitable time after reaction of the oil and acid has progressed to the viscid liquid stage.

17. The method of making a pressure-sensitive adhesive comprising heating and stirring together a polyhydric oil and polybasic acid in proportions potentially capable of forming a toluol-soluble elastomeric gel, the reaction in this stage being advanced sufficiently to produce a viscid liquid resin, then combining with a smaller proportion of tackifier resin containing the abietate radical and continuing heating and mixing to produce a rough rubbery toluol-soluble gel free from lumps and seeds.

18. The method of making a coatable pressure-sensitive adhesive dispersion comprising heating and stirring together 100 parts castor oil and 12–30 parts citric acid until a viscid liquid resin has been formed, then combining with a lesser proportion of ester gum and continuing heating and mixing to produce a toluol-soluble tough rubbery gel free from lumps and seeds, dispersing in a volatile aromatic hydrocarbon solvent vehicle and incorporating a compatible film-forming eupolymer firming agent.

HOWARD C. BRINKER.
GILBERT B. GEHRENBECK.